(No Model.)
A. A. STORY.
THILL COUPLING.
No. 439,609. Patented Oct. 28, 1890.
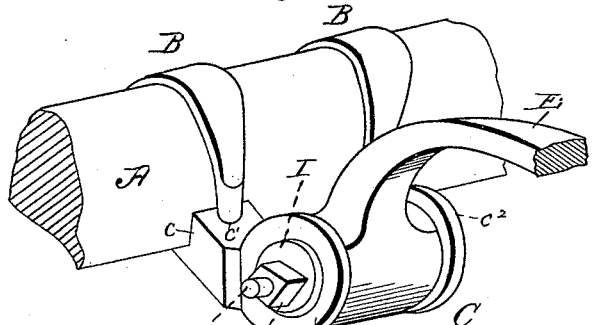
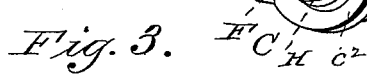
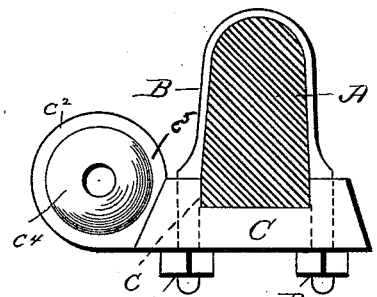
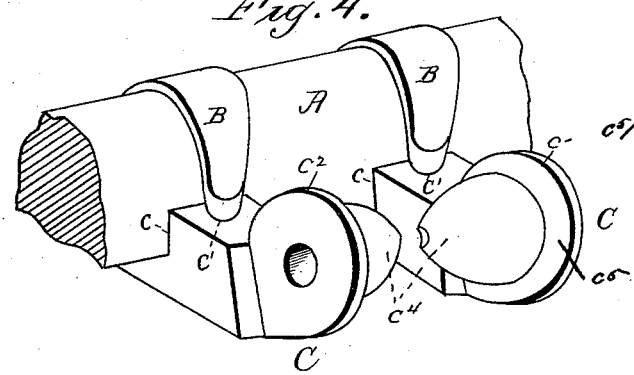
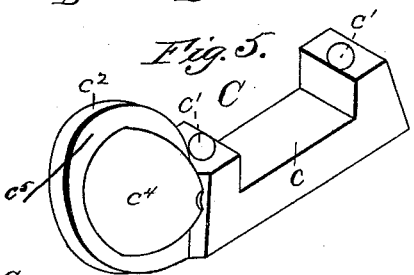
Witnesses
M. B. Harris
C. P. Jones
Inventor
Asa A. Story,
By Arthur L. Morsell
Attorney.

UNITED STATES PATENT OFFICE.

ASA A. STORY, OF TWIN BROOKS, ASSIGNOR OF ONE-HALF TO WILLIAM SHAW, OF MILLBANK, SOUTH DAKOTA.

THILL-COUPLING.

SPECIFICATION forming part of Letters Patent No. 439,609, dated October 28, 1890.

Application filed June 25, 1890. Serial No. 356,638. (No model.)

*To all whom it may concern:*

Be it known that I, ASA A. STORY, a citizen of the United States, residing at Twin Brooks, in the county of Grant and State of South Dakota, have invented certain new and useful Improvements in Thill-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in thill-couplings.

The object of the invention is to provide a construction whereby the friction of the parts brought in contact at the point of coupling is diminished, the rattling of any of such parts prevented, uniformity of action and pressure attained, irregular wear and waste of such parts, and particularly the axle, avoided, and strength and steadiness of action secured.

With the above and other objects in view, the invention consists in the improved construction and combination of parts of the same, as hereinafter more fully described and set forth.

In the accompanying drawings, Figure 1 is a perspective view of a portion of the fore axle of a vehicle, showing the thill coupled thereto. Fig. 2 is a longitudinal sectional view. Fig. 3 is a cross-sectional view. Fig. 4 is a perspective view with the thill removed, and Fig. 5 is a detail view of one of the sections.

Like letters of reference denote like parts throughout the several views.

Referring to the drawings, the letter A indicates the fore axle of a vehicle, said axle being provided at each end with two clips B B.

The letters C C indicate the coupling devices, consisting of forwardly-extending bars provided with sockets $c\ c$, into which the axle is seated, and also provided with suitable bolt-holes $c'\ c'$, through which the lower reduced ends of the clips pass, said clips being held in position by means of nuts D D, engaging the screw-threaded ends thereof. The forward portions of the couplings terminate in partly-circular upwardly-extending portions $c^2\ c^2$, which are formed or provided upon their inner faces with lateral convex conical-shaped lugs or jaws $c^4\ c^4$, the apices thereof being coincident and with but a slight space between. These conical lugs are of less circumference than the forwardly-extending portions $c^2\ c^2$, thereby leaving annular bearing surfaces or flanges $c^5\ c^5$ for the ends of the thill-iron.

The letter E indicates the thill, and E' the thill-iron thereof, the latter being provided with concaved surfaces $e\ e$, which register with the conical or convex jaws $c^4\ c^4$. These thill-irons are retained in place by means of a transverse-headed bolt F, said bolt having interposed between its head and the outer face of one of the jaws a metallic washer G. The opposite end of the bolt is screw-threaded to receive a locking-nut H, and interposed between said locking-nut and the adjacent face of the coupling is a rubber washer I.

It will be seen that provision is made for the reception of the concave thill-irons, so as to permit the same to be received by the jaws without coming into immediate contact with the bolt connecting said jaws, thereby preventing rattling at such points and securing equality of friction as to the various parts, and, furthermore, preventing undue or disproportioned wear and waste of the parts.

By providing the annular bearing-collars $c^5\ c^5$ it will be apparent that provision is made for always retaining the thill-iron in close juxtaposition thereto, thereby preventing rattling from looseness of the several parts, as it is obvious that any looseness, owing to constant wear, may be readily rectified by simply screwing the nut H against the face of the partly-circular portion, and thus forcing the annular bearing collar or flange closer to the end of the thill-iron, the concave surface of the latter and the convex surface of the former assisting in maintaining the close fit.

It will also be noticed that I employ two clips or bands upon the axle instead of one, as ordinarily used, thereby securing the advantage of a distributed pressure equalized as between the two clips, thus securing each more firmly in its place and preventing either from becoming loose and wearing into the wood-work of the axle.

Another point of advantage possessed by my invention is the readiness with which the coupling may be adjusted—that is to say, the distance between the coincident apices of the conical jaws may be regulated. It is obvious that in order to secure either a greater or less space between the two, all that is necessary is simply to loosen the nuts which secure one of the axle-clips, and also loosen the nut upon the end of the transverse bolt. The section of coupling thus released may therefore be readily moved laterally, either closer to or farther away from the opposite section.

My invention, furthermore, combines simplicity of construction with strength and steadiness of movement.

Having thus described my invention, what I claim, and desire to secure by Letters Patent of the United States, is—

In a thill-coupling, the combination, with the fore axle of a vehicle, of bars provided with suitable sockets for the reception of the axle, said bars having their forward ends terminating in partly-circular upwardly-extending portions, the latter formed or provided with inwardly-extending conical convex jaws of less circumference, so as to form annular bearings, collars, or flanges, axle-clips passing through the bars and having their lower ends screw-threaded to receive suitable nuts, thill-irons provided with concave ends registering with the conical convex jaws, a transverse-headed bolt, a washer interposed between the head of the bolt and the outer face of the adjacent jaw, a locking-nut upon the opposite end of the bolt, and a rubber washer intermediate said nut and the adjacent face of the jaw, substantially as set forth.

In testimony whereof I affix my signature in presence of two witnesses.

ASA A. STORY.

Witnesses:
JOHN W. BELL,
H. J. BENEDICT.